United States Patent [19]

Coates

[11] 3,988,123
[45] Oct. 26, 1976

[54] GASIFICATION OF CARBONACEOUS SOLIDS

[75] Inventor: Ralph L. Coates, Provo, Utah

[73] Assignee: The United States of America as represented by the United States Energy Research and Development Administration, Washington, D. C.

[22] Filed: Aug. 15, 1975

[21] Appl. No.: 605,369

[52] U.S. Cl. .................................. 48/73; 48/77; 48/197 R; 48/202; 48/206; 48/210; 122/5; 252/373

[51] Int. Cl.² .......................... C10J 3/20; C10J 3/06

[58] Field of Search ............ 48/202, 206, 209, 210, 48/197 R, 73, 77, 63; 252/373; 122/5

[56] References Cited
UNITED STATES PATENTS

| | | | |
|---|---|---|---|
| 1,467,957 | 9/1923 | Snyder | 122/5 |
| 2,987,387 | 6/1961 | Carkeek et al. | 48/206 |
| 3,000,711 | 9/1961 | Eastman et al. | 48/63 |
| 3,018,174 | 1/1962 | Steever | 48/206 |

*Primary Examiner*—Robert L. Lindsay, Jr.
*Assistant Examiner*—George C. Yeung
*Attorney, Agent, or Firm*—John A. Horan; John A. Koch

[57] ABSTRACT

A process and apparatus for converting coal and other carbonaceous solids to an intermediate heating value fuel gas or to a synthesis gas. A stream of entrained pulverized coal is fed into the combustion stage of a three-stage gasifier along with a mixture of oxygen and steam at selected pressure and temperature. The products of the combustion stage pass into the second or quench stage where they are partially cooled and further reacted with water and/or steam. Ash is solidified into small particles and the formation of soot is suppressed by water/steam injections in the quench stage. The design of the quench stage prevents slag from solidifying on the walls. The products from the quench stage pass directly into a heat recovery stage where the products pass through the tube, or tubes, of a single-pass, shell and tube heat exchanger and steam is generated on the shell side and utilized for steam feed requirements of the process.

8 Claims, 1 Drawing Figure

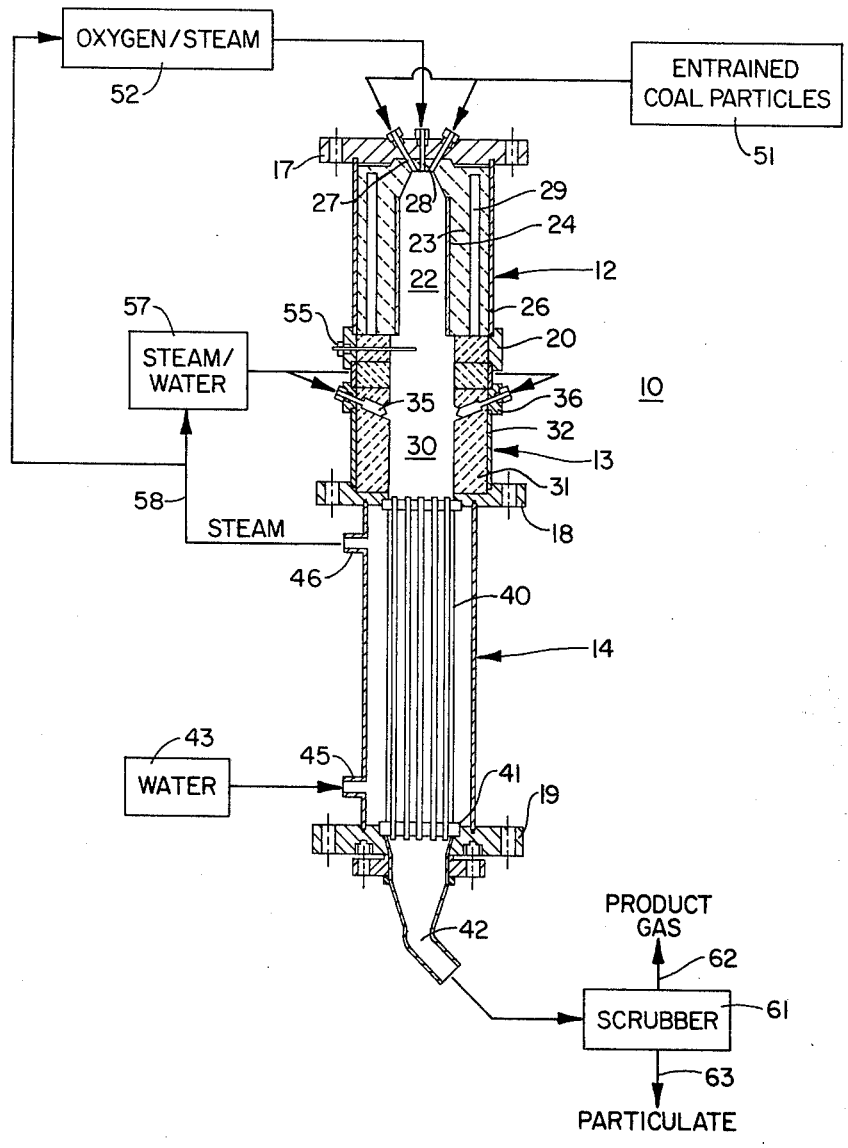

GASIFICATION OF CARBONACEOUS SOLIDS

The invention described herein was made in the course of Contract E(49-18)-1548 with the U.S. Energy Research and Development Administration.

BACKGROUND OF THE INVENTION

This invention relates to the gasification of carbonaceous solids such as coal, sawdust, and the like and more particularly to a process and apparatus utilizing a compact and simply constructed gasifier for converting small particles of such solids to an intermediate heating value fuel gas or to a synthesis gas.

A number of processes (and associated apparatus) have been proposed for converting carbonaceous solids, primarily coal, into gaseous fuels. One such process is known as the "K-T Process," and is the subject of a paper entitled "The K-T Process," by R. Wintrell, presented at the American Institute of Chemical Engineers at the 1974 National Meeting, Salt Lake City, Utah, and a paper entitled "Coal Gasification System Could Ease Energy Supply Pinch," by J. F. Farnsworth which appeared in the August 1973 issue of 33 Magazine/The Magazine of Metal Producing. Another is the Bi-Gas process covered by U.S. Pat. No. 3,746,522, issued on July 17, 1973, in the name of Ernest E. Donath, assignor to the assignee of the instant application.

However, generally speaking, the prior art processes have been characterized by relatively low throughput rates per unit volume and, consequently, by relatively high capital expenditure requirements per unit throughput capacity. Moreover, in the Bi-Gas process of the above-referenced patent, extensive mechanical equipment is required for separating and recycling chars and separating slag. Therefore, in addition to high capital requirements, operating reliability may be a serious problem.

SUMMARY OF THE INVENTION

Accordingly, it is an object of this invention to provide a process and apparatus for accomplishing the gasification of coal and other carbonaceous solids. It is an additional object of the invention to provide a process for the gasification of carbonaceous solids which may be accomplished in apparatus of a more compact size and greater mechanical simplicity than has generally been the case with processes heretofore proposed for such purpose.

Briefly summarized, the above and additional objectives are accomplished by an entrained flow gasification process which employs a pressurized downflow gasifier having two reaction stages followed by a heat recovery stage. Small particles of coal (or other carbonaceous material) entrained in a stream of a fluid are injected into the first or combustion stage of the gasifier. The fluid in which the coal particles are entrained may be air, steam, recycled product gas, oxygen, nitrogen, carbon dioxide or some combination thereof. The coal is reacted under pressure in the combination stage with a preheated mixture of oxygen and steam (or other reaction moderator) which is also injected into the combustion chamber.

The first-stage products pass to the second or quench stage, where they are subjected to a stream (or streams) of liquid water and/or water in the form of steam in order to partially cool and further react them with the water or steam. The temperature of the quench stage is selected to be below the melting point of the ash of the coal, so that the ash solidifies into droplets, and yet high enough to permit downstream recovery of a significant portion of the sensible heat of the combustion products. The partial pressure of steam in the quench stage (and also the subsequent heat recovery stage) is maintained at a level high enough to offset the tendency toward formation of solid carbon particles, i.e., soot, as the temperature of the products from the combustion stage is reduced. The hydrogen/carbon monoxide ratio of the product gas can be controlled by varying the ratio of water to steam fed to the quench stage. The design of the quench stage is such as to prevent the slag which is formed in the combustion stage from solidifying on the walls of the quench stage.

The products from the quench stage pass directly into the heat recovery stage. Due to the presence of ash and slag particles in those products, the heat recovery stage is preferably a single-pass, shell and tube heat exchanger with the products passing through the single or multiple tubes thereof. Steam in excess of the steam feed requirements of the process can be generated on the shell side.

The product gas with entrained ash and slag particles may then be passed through conventional wet scrubbers or other apparatus for removing the particulates therefrom.

The above-mentioned and additional objects and advantage of the invention and a further understanding of the invention will be apparent after considerations of the following description of a preferred embodiment described in conjunction with the accompanying drawing.

BRIEF DESCRIPTION OF THE DRAWING

The single FIGURE of drawing is a partially cross-sectional, partially diagrammatic representation of a preferred embodiment of an apparatus in accordance with the invention.

DESCRIPTION OF PREFERRED EMBODIMENT

Referring now to the drawing, gasifier 10 according to the invention is made up of three stages. The first, or upstream stage 12, is the combustion stage; the second, or middle stage 13, is the quench stage; and the third, or most downstream stage 14, is the heat recovery stage. The three stages are held together by fasteners, not shown, passing through top flange or head plate 17, transition flange 18, and bottom flange 19. Collar 20 provides the transition between combustion stage 12 and quench stage 13.

Combustion chamber 22 of first stage 12 is defined within refractory 23, the inner surface of which may be a high alumina refractory liner 24. A castable refractory identified as A. P. Greencast-97-L, a product of A. P. Green Refractories Co. of Mexico, Mo., having a maximum service temperature of 3300° F have proved very satisfactory for refractory 23 in several demonstrations of the invention. The outer extremities of combustion stage 12 are defined by pressure shell 26. Communication into combustion chamber 22 is provided through a plurality of injectors 27 and 28 which traverse head plate 17. The types of injectors described in U.S. Bureau of Mines Report of Investigations No. 5573 dated 1960 have proved to be satisfactory. One or more heating elements 29, which may be of the electrical resistance type, may be provided if necessary or desired for particular applications of the process such as very small units with low capacity where heat loss per weight of coal tends to be relatively high.

Quench chamber 30 is defined within refractory 31 which, again, may be made from a castable refractory. The diameter of quench chamber 30 is larger than axially aligned combustion chamber 22 for reasons which will be explained hereinafter. The outer extremity of quench stage 13 is defined by outer pressure shell 32. Communication into quench chamber 30 is provided through one or more injectors 35 which traverse collar 36 and refractory 31.

The downstream end of quench chamber 30 is in fluid flow communication with the tube(s) 40 of the single-pass, tube and shell heat exchanger making up heat recovery stage 14. While a plurality of tubes 40 is shown in the drawing, a single-pass tube and shell heat exchanger of the single tube type such as those utilizing a single helical tube could be used.

The discharge ends of heat exchanger tubes 40 are connected through an appropriate flange arrangement 41 for discharge into outlet pipe 42. The heat exchange fluid, such as water 43, is introduced into and removed from the shell side of heat exchanger 14 through nozzles 45 and 46.

Additional details of gasifier 10 and associated components will now be provided in conjunction with the following description of the performance of a preferred embodiment of a process in accordance with the invention.

Pulverized coal (or other particulate carbonaceous material) 51 which is entrained in a stream of a fluid such as air, steam, recycled product gas, oxygen, nitrogen, carbon dioxide or some combination thereof is fed into combustion chamber 22 of first stage 12 through a plurality of peripheral injectors 28. In the demonstrations of the process which will be further discussed by way of the examples, high volatile, bituminous coal from the Co-op Mines, Carbon County, Utah, was milled so that 70–80 percent of the particles were minus 200 mesh.

The coal is reacted in combustion chamber 22 with a mixture of oxygen and steam (or other reaction moderator) 52. While steam will generally be the preferred moderator, other gases such as nitrogen and carbon dioxide could be used in particular applications of the invention.

While in the demonstrations of the invention which will be further described hereinafter the coal particles were entrained in air and injected through injectors 27 and an oxygen/steam mixture was injected through injector 28, it will be apparent that the coal particles could, at least theoretically, be entrained in any one of the gases required or desired to be injected into combustion chamber 22.

The oxygen/steam mixture is preheated, preferably to a temperature range of 600° to 1500° F as may be attained in regenerative heat exchangers, not shown, surrounding the reaction stages. The ratio of oxygen to steam should be in the range 0.5 to 2.0 lb/lb in order to obtain satisfactory efficiency and yet not overheat the refractory. The ratio of oxygen to coal should be such that the temperature at the outlet of combustion chamber 22, as may be determined such as through thermocouple 55, is in the range of 2,000° to 3,000° F, again the considerations of efficiency versus refractory life being determinative. A typical feed ratio for a high-volatile bituminous coal would be on the order of 0.75 pounds oxygen per pound of coal.

The feed injectors 27 and 28 should be arranged to provide as rapid and thorough mixing of the feed streams as possible. The particular arrangement of an axially aligned injector for the entrained coal and 2 injectors equally spaced at an angle of 30° to the axis proved satisfactory in one demonstration of the invention. Gasifier 10 is pressurized so that the reaction occurs at pressure in the range of 50 to 500 psia which is convenient for feeding the coal and yet does not require high cost pressure vessel arrangements.

The volume of combustion chamber 22 should be such that the residence time of the reaction products is of the order of 0.2 to 0.5 seconds and the length-to-diameter ratio should be in the range of about 1 to 3 in order to achieve relatively high conversion efficiencies at relatively low capital costs.

The products of the reactions occurring in combustion chamber 22 pass into quench chamber 30 where they are partially cooled and further reacted with water 57 fed into chamber 30 through injectors 35. Water introduced into the quench stage may be liquid water, steam or a mixture thereof depending upon the requirements of the particular application of the invention. However, the partial pressure of the steam should be maintained at high enough level to suppress the formation of soot in quench stage 13 and/or subsequent heat recovery stage 14. As products from combustion stage 12 are cooled, the chemical composition shifts and unless the partial pressure of steam is maintained at a high enough level, there is a tendency for the chemical equilibria to favor the formation of solid carbon as soot particles. The optimum level of the partial pressure of steam to negate that tendency under the conditions of a particular application of the invention will be readily determinable by those skilled in the art. Adjustment of that level can be readily accomplished by adjustment of the ratio of the steam to the water injected into quench chamber 30 through injector(s) 35.

The water should be fed to this stage at a rate sufficient to cool the combustion products to a temperature range of from 1,500° to 2,000° F, the particular temperature selected being below the melting point of the ash of the coal yet high enough to permit downstream recovery of a significant portion of the sensible heat of the combustion products. In applications such as the production of synthesis gas where it is desirable for the final product to contain a high ratio of hydrogen to carbon monoxide, the feed to quench stage 13 may be controlled to promote formation of additional hydrogen via the shift reaction. This reaction will be favored by feeding steam into the quench stage rather than water since given a specified cooling effect, the resulting partial pressure of the steam in the quench stage mixture will be higher. One or more atomizing type feed injectors 35 are located in the quench stage in order to promote rapid mixing and cooling of the water with the reaction products from the combustion stage.

The diameter of quench chamber 30 should be greater than combustion chamber 22 in order to provide an abrupt increase in diameter at the entrance to the quench chamber. This design feature prevents the slag which is formed on the walls of the combustion chamber from flowing down and solidifying on the walls of the quench stage. The slag drips off of the walls of the combustion chamber into the volume of the quench chamber where it is cooled into particulate which is carried forward with the gaseous reaction products. Quench chambers having diameters greater than the combustion chamber by a factor from 1.1 to 3 have proved satisfactory. The volume of the quench stage should be such that the residence time in this stage is in the range of 0.5 to 2 seconds.

The products from the quench stage pass directly into heat recovery exchanger 14. Because of the presence of ash and slag particles, it is preferable that the products pass through the single tube or multiple tubes 40 of a single-pass shell and tube exchanger. Steam 58 can be generated on the shell side of this exchanger in excess of that necessary to satisfy the steam feed requirements of the process.

The product gas with entrained particles of ash and slag exits heat recovery stage 14 through pipe 42 and is transported to scrubber 61 where product gas 62 is separated from the ash and slag particulates 63. The particulates may be periodically removed from scrubber 61 by conventional means such as a lock hopper, not shown. A portion of the product gas may be used to entrain the coal particles therein to form the coal feed stream 51. The use of product gas rather than air for that purpose would have an advantage in the elimination of the dilution of the product gas with nitrogen which would be introduced by way of an air feed. Of course, the selection of a particular fluid with which to entrain the coal particles for feeding them into combustion stage 12, whether that fluid be or contain constituents which take part in the reactions in the combustion chamber or constituents which merely moderate those reactions, or some combination thereof, would be dictated by the particular application of the invention desired.

EXAMPLES

Two speficic examples, which in no way limit the principle and scope of the invention as expressed in the claims appended hereto, are presented here by way of operating data obtained in connection with the demonstration of process development units. Typical data obtained is presented in Table 1. In Case A, coal entrained in an air stream was fed at a rate of 30 pounds per hour to a gasifier 10 equipped with a 3 inch I.D. by 12 inch long combustion chamber 22 and a 6 inch I.D. by 12 inch long quench chamber 30 and a heat recovery stage 14 having six 1.5 inch O.D. tubes 40. The oxygen coal ratio, including the oxygen in the air stream, was 0.83 lb/lb and the steam/coal ratio was 0.87 lb/lb.

In Case B, the coal was fed at the same rate to a gasifier 10 of the same configuration, except for a 5 inch I.D. combustion stage. The comparable ratios for Case B were 0.89 and 0.75 respectively. In both cases, the operating pressure was 71 psia and room temperature water was fed to the quench stage at a rate of 10 lbs/hours. As can be noted from the table, the specific gasification rates were 215 and 57 pounds coal gasified per hour per cubic foot of combustion stage volume per atmosphere operating pressure. Carbon burn-off was 90 and 95 percent and the cold product gas efficiency was 73 and 72 percent.

TABLE 1

| TYPICAL OPERATING DATA FROM PROCESS DEVELOPMENT UNITS | | |
|---|---|---|
| | Case A | Case B |
| COAL FEED RATE, lbs/hour | 30 | 30 |
| Oxygen/coal, lb/lb | 0.68 | 0.76 |
| Steam/coal, lb/lb | 0.87 | 0.75 |
| Air/coal, lb/lb | 0.65 | 0.54 |
| PRODUCT GAS FLOW RATE, SCFH | 1171 | 1191 |

TABLE 1-continued

| TYPICAL OPERATING DATA FROM PROCESS DEVELOPMENT UNITS | | |
|---|---|---|
| | Case A | Case B |
| GAS ANALYSIS, Volume Percent Dry | | |
| Hydrogen | 32 | 32 |
| Nitrogen | 17 | 15 |
| Carbon Monoxide | 29 | 34 |
| Methane | 2 | 1 |
| Carbon Dioxide | 18 | 17 |
| SPECIFIC GASIFICATION RATE | | |
| Lbs. coal/hour ft$^3$ atm | 215 | 57 |
| CARBON BURN-OFF, Percent | 90 | 95 |
| COLD GAS EFFICIENCY, Percent | 73 | 72 |
| HEATING VALUE (Nitrogen Free Basis) BTU/SCF | 285 | 272 |

While the fundamental novel features of the invention have been shown and described and pointed out as applied to particular embodiments by way of example, it will be appreciated by those skilled in the art that various omissions, substitutions and changes may be made within the principle and scope of the invention as expressed in the appended claims.

What I claim is:

1. A process for converting carbonaceous solids to an intermediate heating value fuel gas or synthesis gas comprising:
    a. Mixing small particles of said carbonaceous solid with oxygen and a reaction moderator by injecting streams of said particles, oxygen and moderator under selected temperature and pressure into a combustion stage at the top of a downflow gasifier having three fastened together stages to cause partial combustion and reaction of said particles;
    b. Passing the products of step a. directly into the second stage which is a quench stage axially aligned with but of larger inner diameter than said combustion stage and subjecting said products of step a. to a stream of water injected into said quench stage at a temperature low enough to cause solidification of ash and slag into small particles but high enough to permit later recovery of sensible heat; and
    c. Passing the gaseous product with entrained particles of ash and slag of step b. directly into a heat recovery stage and recovering sensible heat from said products of step (b).

2. The process of claim 1 wherein said small particles of said carbonaceous solid are introduced into said mixing step in a stream comprising said particles entrained in a fluid selected from the group consisting of air, steam, recycled product gas, oxygen, nitrogen, carbon dioxide or a mixture of any two or more of them.

3. The process of claim 1 wherein said reaction moderator is steam and said particles of solid are injected into said combustion stage entrained in a fluid stream.

4. The process of claim 3 wherein said step of recovering sensible heat is accomplished in a single-pass tube and shell-type heat exchanger means wherein the products from the quench stage pass through the at least one tube thereof.

5. The process of claim 4 wherein the carbonaceous solid is coal over 70 percent of said particles of which are minus 200 mesh, said selected temperature at the outlet of said combustion chamber is in the range 2,000° to 3,000° F, said selected pressure is in the range of 50 to 500 psia, said step of subjecting the products of said combustion chamber to a stream of water in the quench chamber cools said products to a temperature range of 1,500° to 2,000° F and a further reaction of said products with the water takes place, and including the steps of adjusting the partial pressure of steam in said quench chamber and said heat exchanger means by adjusting the steam/liquid water ratio of the stream of water to which the products of the combustion step are subjected and of removing ash and slag particles from the product stream after the heat recovery step.

6. A three stage downflow gasifier for converting carbonaceous solids to an intermediate heating value fuel gas or synthesis gas comprising:
 a. A combustion chamber defined in the first stage of a three stage downflow gasifier;
 b. Means for introducing small particles of said carbonaceous solid, oxygen and a reaction moderator into the top of said combustion chamber in a manner to promote the mixing and reaction thereof at selected temperature and pressure;
 c. A quench chamber defined in the second stage axially aligned with and fastened directly to the bottom of said combustion chamber for receiving the reaction products of said first stage directly therefrom and having an inner diameter larger than said combustion chamber to provide an abrupt increase in diameter between said first and second stages whereby the solidification of slag on the walls defining the quench chamber is prevented;
 d. Means for subjecting said products of said first stage to at least one stream of water in said quench chamber whereby said products are cooled below the melting point of the ash of said carbonaceous solid;
 e. Means adjacent said quench chamber defining a third stage for receiving the reaction products directly therefrom and for extracting heat from said reaction products; and
 f. Means for separating particulates out of the reaction products leaving said heat extracting means.

7. The apparatus of claim 6 wherein the volume of said combustion chamber is such that the residence time of reaction products therein is on the order of 0.2 to 0.5 seconds.

8. The apparatus of claim 7 wherein the volume of said quench chamber is such that the residence time of the reaction products therein is on the order of 0.5 to 2 seconds.

* * * * *